United States Patent
Dharawat et al.

(10) Patent No.: US 7,853,597 B2
(45) Date of Patent: Dec. 14, 2010

(54) PRODUCT LINE EXTRACTION

(75) Inventors: Nimish G. Dharawat, Bellevue, WA (US); Meera Mahabala, Redmond, WA (US); Gitika Gupta, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 12/110,390

(22) Filed: Apr. 28, 2008

(65) Prior Publication Data

US 2009/0271367 A1 Oct. 29, 2009

(51) Int. Cl.
*G06F 17/30* (2006.01)

(52) U.S. Cl. .............. 707/741; 435/5; 707/2; 707/3; 707/102; 707/E17.014

(58) Field of Classification Search ............... None
See application file for complete search history.

(56) References Cited

U.S. PATENT DOCUMENTS

| | | | |
|---|---|---|---|
| 5,918,214 A | | 6/1999 | Perkowski |
| 6,286,002 B1 | | 9/2001 | Axaopoulos |
| 6,484,149 B1 | * | 11/2002 | Jammes et al. ............... 705/26 |
| 6,556,997 B1 | | 4/2003 | Levy |
| 7,055,737 B1 | | 6/2006 | Tobin |
| 7,085,736 B2 | | 8/2006 | Keezer |
| 2002/0004764 A1 | | 1/2002 | Stolze |
| 2002/0010709 A1 | | 1/2002 | Culbert |
| 2005/0289168 A1 | * | 12/2005 | Green et al. ................ 707/101 |
| 2006/0031202 A1 | | 2/2006 | Chang |
| 2006/0287988 A1 | * | 12/2006 | Mason ........................ 707/3 |
| 2007/0239741 A1 | * | 10/2007 | Jordahl ....................... 707/100 |

OTHER PUBLICATIONS

Kristina Lerman, Craig Knoblock and Steven Minton, "Automatic Data Extraction from Lists and Tables in Web Sources", 2001, Information Sciences Institute University of Southern California, Fetch Technologies.

Bing Lu, Robert Grossman and Yanhong Zhai, "Mining Data Records in Web Pages", SIGKDD '03, Aug. 24-27, 2003, Washington, DC, USA.

David Bottler, Ling Liu, and Calton Pu, "A Fully Automated Object Extraction System for the World Wide Web", Georgia Institute of Technology, College of Computing, Atlanta, GA, USA.

* cited by examiner

*Primary Examiner*—Don Wong
*Assistant Examiner*—Shyue Jiunn Hwa
(74) *Attorney, Agent, or Firm*—Shook Hardy & Bacon LLP (57) ABSTRACT

Methods, systems and computer readable media for extracting product lines from a plurality of product titles are provided. In one embodiment, the plurality of product titles are broken into tokens. Association rules are calculated for individual tokens and pairs of tokens. Brand specific terms and product class specific terms within the product titles are identified. In one embodiment, a token tree is used to identify product lines within the list of product titles using the association rules, the brand specific terms, and the product class specific terms.

18 Claims, 4 Drawing Sheets

PRODUCT LINE EXTRACTION

BACKGROUND

A product may be described by a combination of a brand name, product line, and model. For example, the Honda Accord LX, includes the Honda brand, Accord product line, and the LX model. Manufactures, vendors, retails, and others may internally maintain or publish lists of products that can contain multitude brands, product lines, and models.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to a system and method for extracting product lines from a list of product titles without human intervention. Within the product list, an individual product title typically will describe an individual product using at least a brand name, product line, model specific terms, and product class specific terms. A product line is a brand specific line of products for which multiple models may be available (e.g. Dell Latitude, Apple iPod Nano). This is in contrast to a product class which describes a type of product across multiple brands (e.g. digital camera, laptop computer). In one embodiment, a list of product titles is received and broken into tokens. Pairs of tokens are then assigned a series of association rules that indicate how often the pairs of tokens appear together in a product title. Using the association rules in combination with various heuristics, some of the individual tokens and pairs of tokens are determined to be brand names, model specific terms, and product class specific terms. These tokens may be excluded as possible product lines. In one embodiment, product lines are extracted from the remaining tokens by building a token tree that is traversed to generate a list of product lines.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention generally relate to a system and method for extracting product lines from a list of product titles without human intervention. Within the product list, an individual product title typically will describe an individual product using at least a brand name, product line, model specific terms, and product class specific terms. A product line is a brand specific line of products for which multiple models may be available (e.g. Dell Latitude, Apple iPod Nano). This is in contrast to a product class which describes a type of product across multiple brands (e.g. digital camera, laptop computer). In one embodiment, a list of product titles is received and broken into tokens. Pairs of tokens are then assigned a series of association rules that indicate how often the pairs of tokens appear together in a product title. Using the association rules in combination with various heuristics, some of the individual tokens and pairs of tokens are determined to be brand names, model specific terms, and product class specific terms. These tokens may be excluded as possible product lines. In one embodiment, product lines are extracted from the remaining tokens by building a token tree that is traversed to generate a list of product lines.

Accordingly, in one embodiment, one or more computer-readable media having computer-executable instructions embodied thereon for performing a method of extracting product lines from a plurality of product titles are provided. The method includes receiving the plurality of product titles, breaking the plurality of product titles into a plurality of tokens, wherein the plurality of tokens includes unigrams and bigrams, and generating an association rule for each of a plurality of token pairs, wherein a token pair may include two of the bigrams, two of the unigrams, or one bigram and one unigram. The method further includes generating a plurality of brand specific tokens that form part of a brand name and generating a plurality of product class specific tokens using the plurality of brand specific tokens and the association rule for each of the plurality of token pairs. The method also includes generating a plurality of model specific tokens that form part of a product model. The method further includes generating a plurality of product lines from the plurality of tokens.

In another embodiment, a computerized system for generating a list of product lines from a list of product titles is provided. The system includes an association rule builder that calculates an associative probability that a first token is associated with a second token, wherein the first token and the second token are generated from the list of product titles. The system also includes a product class extractor that identifies product class specific tokens within the list of product titles, wherein the product class specific token describes a product category that is recognized across multiple brands. The system further includes a product line extractor that identifies product lines within the list of product titles.

In yet another embodiment, one or more computer-readable media having computer-executable instructions embodied thereon for performing a method of extracting product lines from a group of product titles is provided. The method includes tokenizing the group of product titles to create a plurality of tokens, wherein the plurality of tokens includes unigrams and bigrams. The method also includes generating an association rule for token pairs generated from the plurality of tokens, wherein the association rule indicates how frequently an individual pairing of tokens occur together within the group of product titles. The method further includes creating a product line token tree that includes a brand specific token as a root node and suffix tokens as second level nodes. The method also includes analyzing token branches on the product line token tree to generate a plurality of product lines, wherein a token branch includes the root node and a suffix token. The method also includes storing the plurality of product lines.

Having briefly described an overview of embodiments of the present invention, an exemplary operating environment suitable for use in implementing embodiments of the present invention is described below.

Exemplary Operating Environment

Figure 1:
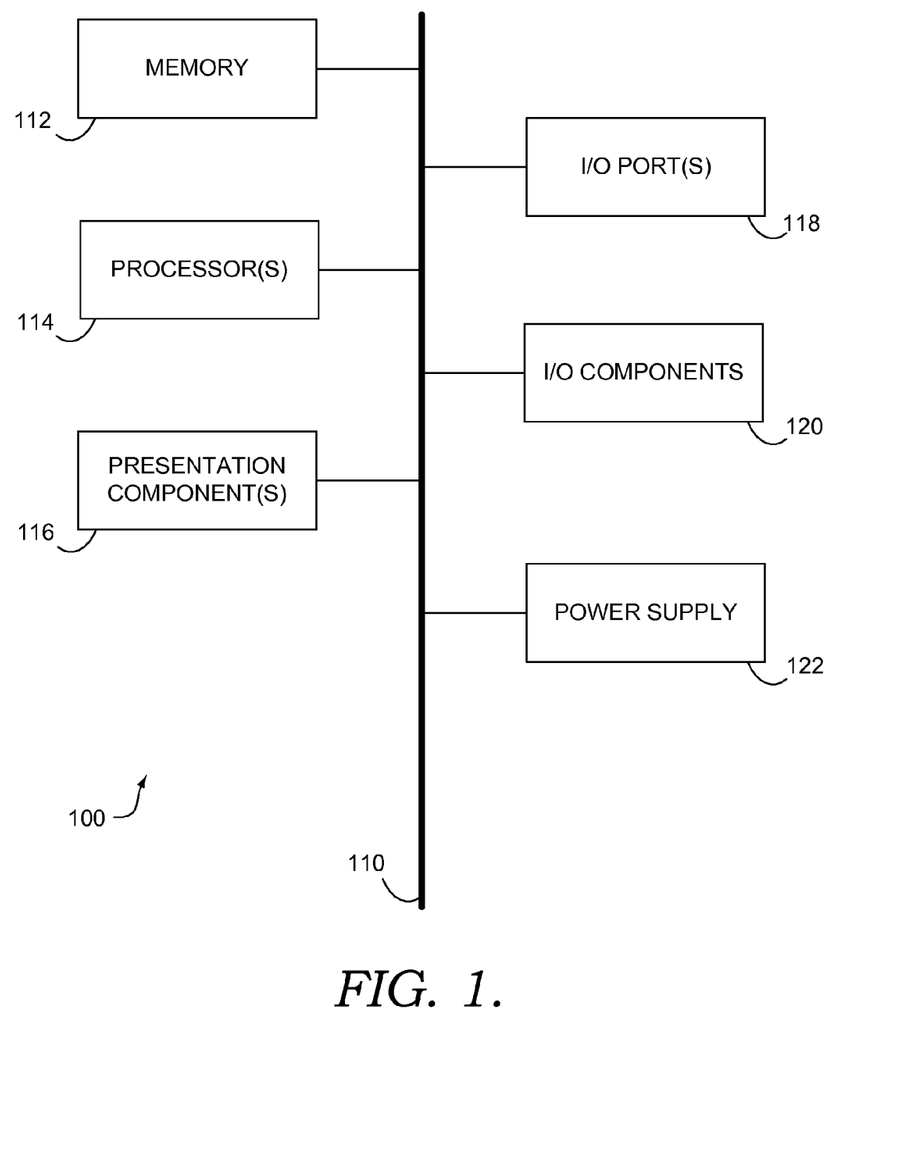
FIG. 1 is a block diagram of an exemplary computing environment suitable for implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer storage media in the form of volatile and/or nonvolatile memory. The memory may be removable, non-removable, or a combination thereof Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Exemplary System Architecture

Figure 2:
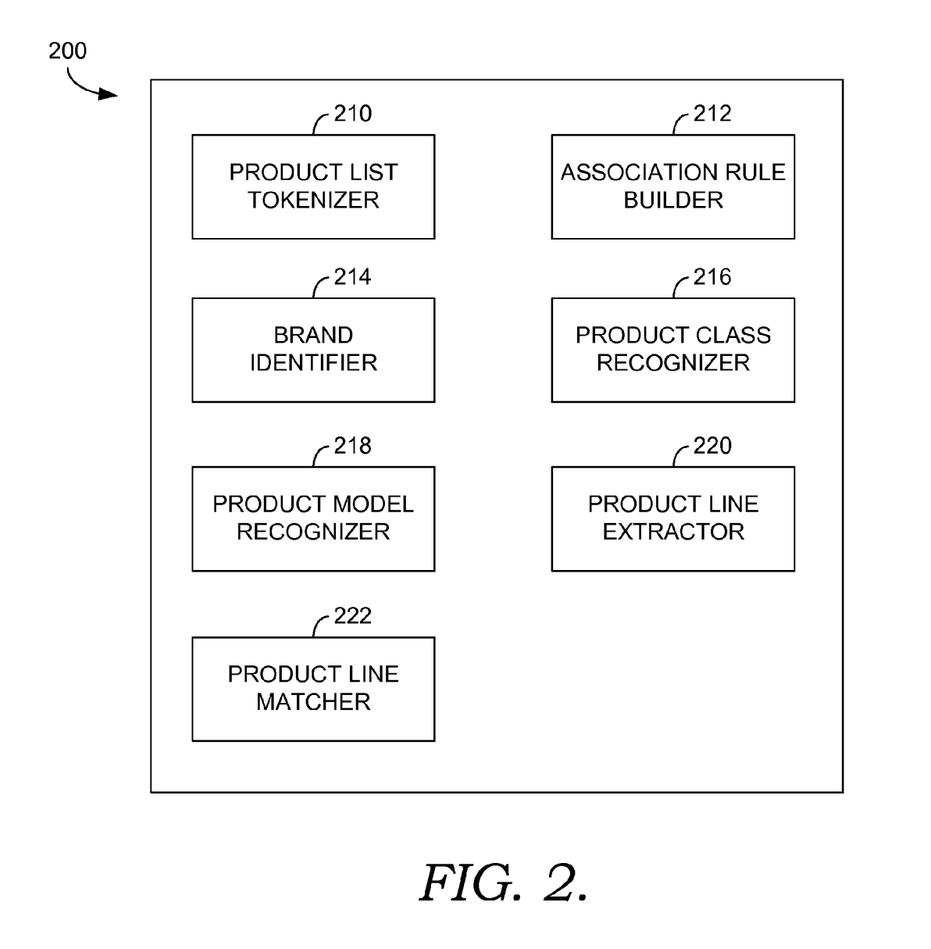
FIG. 2 is a block diagram of exemplary computing system suitable for implementing embodiments of the present invention.

Turning now to FIG. 2, a block diagram is illustrated that shows an exemplary computing system architecture 200 suitable for extracting product lines from a list of product titles, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of the use or functionality of the present invention. Neither should the computing system architecture 200 be interpreted as having any dependency or requirement related to any single component/module or combination of component/modules illustrated therein.

Computing system architecture 200 includes a product list tokenizer 210, an association rule builder 212, a brand identifier 214, a product class recognizer 216, a product model recognizer 218, a product line extractor 220, and a product line matcher 222. Computing system architecture 200 may reside on a single computing device, such as computing device 100 shown in FIG. 1. In the alternative, computing system architecture 200 may reside in a distributed computing environment that includes multiple computing devices coupled with one another via one or more networks. Such networks may include, without limitation, one or more local area networks (LANs) and/or one or more wide area networks (WANs). Such network environments are commonplace in offices, enterprise/wide computer networks, intranets, and the Internet. Accordingly, the network, or combination of networks, is not further described herein.

The product list tokenizer 210 breaks a list of product titles into a list of tokens. A token is an alphanumeric string occurring between designated delimiters (e.g. a space) in the product title. For example, a single word occurring in the product title may be a token. The tokens may be organized as unigrams and bigrams. A unigram is a single token. A bigram is two tokens that are adjacent to one another in a product title or are separated by a character set that is ignored for the sake of assembling bigrams. By way of example, if the product title is "Sony MX", then "Sony" is a unigram and "MX" is a unigram and "Sony MX" is a bigram. As an initial step, the product list tokenizer 210 may exclude "stop" words from the alphanumeric strings found in the list of product titles. A stop word is a word that will commonly appear in product titles, but not be part of a product line. For example, "the," "and," "an," and "a"

are all stop words that would be excluded from the list of unigrams and bigrams. In one embodiment, the product list tokenizer 210 accesses a list of stop words from a data store communicatively coupled to the product list tokenizer 210. In one embodiment, alphanumeric strings separated by a stop word are not joined together to form bigrams. In one embodiment, the last token in a product title forms a bigram with an "end" token that acts as an ending delimiter. The "end" token is an artificial token that is not taken from the list of product tokens.

The product list tokenizer 210 utilizes a set of text rules to identify alphanumeric strings that are used to build the unigrams and bigrams. For example, the product list tokenizer 210 may look for delimiters such as a space, and use each alphanumeric string between spaces, which is not a stop word, to create the unigrams and bigrams. Once created, the list of unigrams and bigrams may be stored for further processing.

The association rule builder 212 receives or retrieves the list of tokens and assigns one or more association rules to combinations of unigrams and bigrams. The association rule provides an indication of how frequently the two tokens appear together in a particular order within the list of product titles. For example, the association rule may indicate how frequently a first token comes after a second token within the product titles. An association rule may also be formed indicting how frequently two tokens appears together in any order. In one embodiment, an association rule is assigned to every possible combination of tokens that occur together in a product title. A combination may include two unigrams, two bigrams, or a unigram and bigram.

In one embodiment, an association rule includes a support factor and a confidence factor. The support factor is the total number of times a first token and a second token appear together in a certain order within a single product title divided by the total number of product titles. The confidence factor is the number of times a first token and a second token appear together in a certain order within a product title divided by the number of times the first token occurs within the list of product titles. In one embodiment, the association rule builder 212 generates an association rule for every possible combination of tokens that appear together within the product list. These rules may be stored as a file in a data store for subsequent use.

The brand identifier 214 receives information containing brand names from one or more sources and identifies brands within that information. In one embodiment, the sources of information include a list of product titles and a brand dictionary (e.g. a list of brands). The list of products include a brand name associated with each product title. The brand may be included in a product title, but also listed separately in association with individual product titles. These information sources are broken into tokens and organized as unigrams and bigrams.

The unigram and bigrams derived from these sources of information are evaluated using a series of heuristics to determine if an individual unigram or bigram is a brand. In one embodiment, three potential brand lists are created using the brand tokens created from the brand dictionary and the brand list from the list of product titles. The first list includes prefix unigrams and bigrams from the product title list that occur as prefixes to the associated brand name. The first word in the product title is a prefix to the product title. For example, if the associated brand is Dell and the associated product title is Dell Latitude D630 then the unigram Dell would be added to the first list because it is the first token in the product title. The tokens on the first list have a high probability of being brands. The second list includes tokens from the product list that are not specifically designated as brands, but occur more than a threshold number of times at the start of a product title. The third list includes all unigrams and bigrams derived from the product title list that occur as the first unigram or bigram in a potential brand from the brand dictionary. These three lists are then evaluated to determine which tokens are brand specific.

The brand identifier 214 may generate association rules for each token on each of the lists to determine which tokens are related to each other. A token is determined to be related to another token if the score from the association rule is above a designated threshold. Both a support factor and a confidence factor are created for each combination of tokens from the lists.

In one embodiment, the relationships between tokens are used to calculate a brand count and a high confidence brand count for each token on each of the lists. The brand count is the number of other tokens an individual token is related to. The high-confidence brand count is the number of tokens on the first list that are related to an individual token on any of the three lists. The brand count and high-confidence brand count values are stored in association with the token for which it is calculated.

An additional step, used to determine whether a token is a brand, is to determine the difference in brand confidence between each related token. The brand confidence difference for token A with respect to related token B is the confidence that B occurs when A occurs (A→B) minus the confidence that A occurs when B occurs (B→A). An average brand confidence difference is then calculated for each token. The average brand confidence difference for an individual token is the average of all the brand confidence differences calculated for each token related to the individual token.

Having generated association rules, a brand count, a high confidence brand count, and an average brand confidence difference for each token on each of the three lists, the lists may be combined into a single list that is sorted using various sorting rules. In one embodiment, the first sort rule causes tokens on the first list to be moved ahead of tokens only on the second and third list. The second sort rule causes tokens in the second list to be moved ahead of tokens only on the third list. Tokens not on the first or second list are placed after the other tokens. The third sort rule causes tokens having the same characteristics used by the first and second sort rules to be sorted according the brand count value associated with the token. Thus, the single list will include tokens from the first list sorted by brand count value, followed by tokens from the second list (that are not also on the first list) sorted by brand count value, followed by tokens only on the third list sorted by brand count value. When sorting by brand count, tokens with lower brand counts are moved ahead of tokens having a higher brand count.

In one embodiment, for each pair of related tokens a brand confidence and related brand confidence is determined. For token A related to token B, a brand confidence is the confidence factor that token B occurs when token A occurs. A related brand confidence is the confidence that A occurs when token B occurs. The confidence is calculated as described previously with reference to the association rules. The sorted list of brand tokens may then be analyzed to determine which tokens on the list are brands.

The sorted list is then analyzed to determine which unigrams and bigrams on the list are probable brands. As the starting point of the analysis, each token is assigned a brand exclusion factor of zero. The brand exclusion factor may increase for certain tokens during the analysis. Each token on the list may be evaluated in turn. The token undergoing analysis is referred to as the current token during the following description. The determination of whether a token is related to the current token has been described previously. Several aspects of a relationship between the current token and the related token are evaluated to determine if the exclusion factor for the related token should be increased.

In one embodiment, the brand exclusion factor of the current token and the related token are increased based on heuristics formed using one or more of: the difference between the related brand confidence and the brand confidence; the difference between the average-brand-confidence difference of the related brand and the current brand; the high-confidence-brand count; the current token and the related token occurring as a prefix of one another; the current token and related token occurring a as a prefix in product title; the high-confidence brands that are related to the brand tokens of the current brand; and the current exclusion factor of current token and related token.

After evaluating each token on the list and determining a brand exclusion factor for each token, all tokens with a brand exclusion factor of zero that are also substrings of a token with a brand exclusion factor of zero should be removed from the list. This forms the final brand list.

The product class recognizer 216 identifies product class specific tokens within the list of product titles. A product class describes a category of products that are sold under multiple brand names. For example, camera and digital camera are product classes. The term used to describe a product class within the product titles should be used across different brands. In one embodiment, the product class recognizer 216 receives the list of brands from the brand identifier 214 and the association rules from the association rule builder 212. The product class recognizer 216 begins the process of identifying product class specific tokens by identifying tokens that occur within the product titles across multiple brands. Tokens that occur across brands and that are related to above a threshold number of brand tokens are recognized as product class specific tokens.

The product model recognizer 218 identifies model specific tokens. The product model recognizer 218 may evaluate each unigram and bigram generated by the product list tokenizer 210. In one embodiment, the product model recognizer 218 determines that a token is a model specific token if the token is a number. In another embodiment, a token is determined to be a model specific token if it matches a designated model format and occurs with below a threshold frequency within the list of product titles. In a further embodiment, a token is determined to be a model specific token if it matches a designated model format and has a prefix token that occurs as a prefix to other tokens matching the designated model format above a threshold number of times.

The product line extractor 220 identifies product lines within the list of product titles. A product line is a brand-specific category of products. For example, the Apple iPod Nano and Dell Latitude are product lines. In one embodiment, the product line extractor 220 receives the unigrams and bigrams from the product list tokenizer 210, association rules from the association rule builder 212, the list of brands from the brand identifier 214, the list of product class specific tokens from the product class recognizer 216, and a list of model specific tokens from the product model recognizer 218. The information received by the product line extractor 220 is used to identify the product lines within the list of product titles.

In one embodiment, the product line extractor 220 starts the product line identification process by building a token tree using a brand specific token as a the root node or root token.

In one embodiment, each brand specific token in the final brand list is processed to identify product lines. The product line extractor 220 then begins evaluating bigrams that occur as a suffix to the root token and have an association confidence between the root token and current token or current token and root token above a predetermined association-confidence threshold. Bigrams that occur as a suffix to the root brand and have a confidence level above the threshold are added to the token tree.

The new node is evaluated and assigned a tag that reflects the outcome of the evaluation. All nodes are initially tagged as a 'Normal node'. Nodes recognized as product class specific tokens are tagged as a 'Product Class Related node'. Nodes recognized as model specific tokens are tagged as 'Model related node'. Nodes with a confidence between the suffix token and the root token with a high confidence parent node are tagged as 'Exclusion node'. If nodes tagged as 'Exclusion node' is strongly associated with one of the nodes above their parent, then such nodes are re-added as 'Normal node' to the parent node they are strongly associated with. Newly added nodes, except 'Product Class Related' nodes, are further expanded and tagged using similar criteria.

Once the token tree is built, the product line extractor 220 travels the tree and extracts the product lines from it. It is then able to create a list of product lines. When traveling the tree, potential product lines are evaluated based on the support factor and tags. Potential product lines with a support factor below a threshold and including tokens from nodes tagged as 'Product Class Related node', 'Model Related node' or 'Exclusion node' are determined not to be product lines.

The product line matcher 222 is used to map product lines to a given product title from the original product title list. The product line matcher 222 allows the product titles to be organized or sorted by product lines. Thus, all product titles associated with a single product line could be presented together using the map produced by the product line matcher 222.

Figure 3:
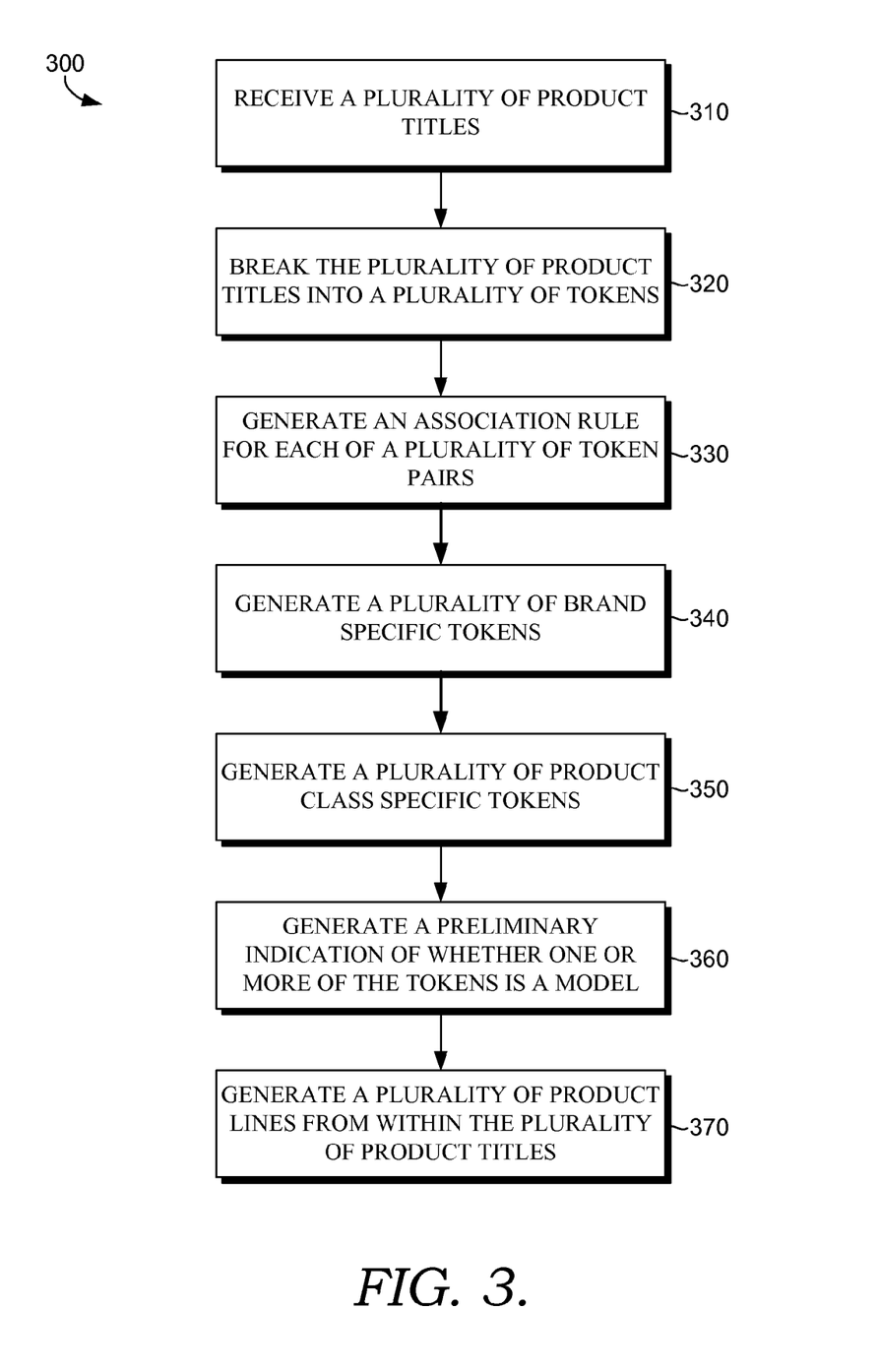
FIG. 3 is a flow diagram showing a method of extracting product lines from a plurality of product titles, in accordance with embodiments of the present invention.

With reference to FIG. 3, a flow chart showing a method of extracting product lines from a plurality of product titles is shown, and designated generally with reference numeral 300. At step 310, a plurality of product titles is received. The plurality of product titles may include a brand associated with each product title within the plurality. In one embodiment, the plurality of product titles are received in a data file. In another embodiment, the plurality of product titles are retrieved from a data store. As described previously, a product title describes a product and may include a brand name, model, a product line, and product classes. Each of these components of a product title has been described previously with reference to FIG. 2.

At step 320, the plurality of product titles are broken into a plurality of tokens. In one embodiment, the plurality of tokens includes unigrams and bigrams. As described previously, a unigram is a single token and a bigram is two tokens. Both unigrams and bigrams have been described previously with reference to FIG. 2. In one embodiment, stop words are excluded from use in forming unigrams and bigrams.

At step 330, an association rule for each of a plurality of token pairs is generated. A token pair may include two bigrams, two unigrams, or one bigram and one unigram. The formation of association rules including the calculation of a support factor and a confidence factor has been described previously with reference to FIG. 2. The association rules may be stored in a data store or other form of memory for subsequent use.

At step 340, a plurality of brand specific tokens are generated. A brand specific token forms part of a brand name. The plurality of brand specific tokens may be generated using a brand dictionary and the tokens from the plurality of product titles, as described previously with reference to FIG. 2.

At step 350, a plurality of product class specific tokens are generated using a list of brand specific tokens and the association rule for each token pair. As described previously, a product class is a term such as camera that may be used to describe products across brands. In other words, a product class is not specific to a particular brand but generically describes a type or class of product. An embodiment used to generate product classes has been described previously with reference to FIG. 2.

At step 360, an indication of whether one or more tokens are a model specific token is generated. In one embodiment, a token is a model specific token if it contains numbers. In another embodiment, a token is evaluated against a presumptive model template. Tokens conforming to the presumptive model template with a low frequency of occurrence are determined to be model specific tokens.

At step 370, one or more product lines are identified from the product list. In one embodiment, product lines are identified by building a token tree. In one embodiment, the base, or first level, of the token tree is built using identified brand specific tokens. Additional tokens are added as leaves to the brand specific token and evaluated. Leaves with a high degree of confidence between the leaf and the root node are determined to be product lines.

Figure 4:
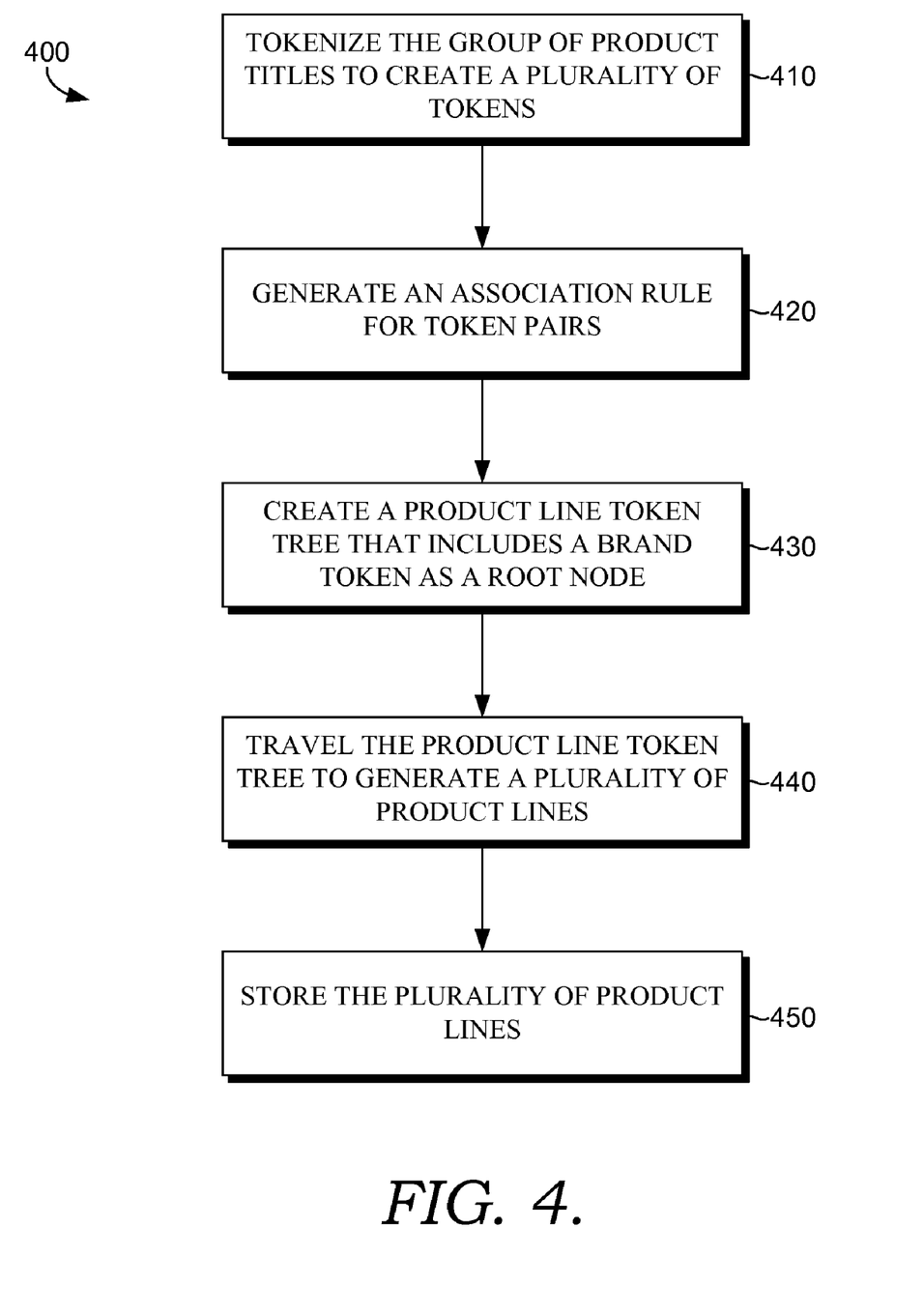
FIG. 4 is a flow diagram showing a method of extracting product lines from a group of product titles, in accordance with embodiments of the present invention.

With reference to FIG. 4, a flow chart showing a method of extracting product lines from a group of product titles is shown, and designated generally as reference numeral 400. At step 410, the group of product titles is tokenized to create a plurality of tokens. The plurality of tokens may include unigrams and bigrams, which have been described previously. At step 420, an association rule for token pairs is generated from the plurality of tokens. The association rules indicate how frequently an individual pairing of tokens occurs together within a group of product titles. As described previously, the association rule may include a support factor and a confidence factor.

At step 430, a product line token tree that includes a brand token as a root node and suffix tokens as second level nodes is created. The brand tokens may have been determined previously through a process described with reference to FIG. 2. A suffix token is a token that occurs after another token within at least one product title. At step 440, the product line token tree is traveled to generate a plurality of product lines. While traveling the token tree, the characteristics of pairs of tokens within the trees are evaluated. Pairs, or strings of tokens with characteristics meeting a predetermined criteria are determined to be product lines. At step 450, the plurality of product lines are stored.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable media having computer-executable instructions embodied thereon for performing a method of extracting product lines from a plurality of product titles, the method comprising:

receiving the plurality of product titles;

breaking the plurality of product titles into a plurality of tokens, wherein the plurality of tokens includes unigrams and bigrams;

generating an association rule for each of a plurality of token pairs, wherein a token pair may include two of the bigrams, two of the unigrams, or one bigram and one unigram, wherein the association rule includes a confidence factor and a support factor, wherein the support factor is a total number of times a first token and a second token occur together in a single product title divided by a total number of product titles within the plurality of product titles, and wherein the confidence factor is the total number of times the first token and the second token occur together within the plurality of product titles divided by a number of times the first token occurs within the plurality of product titles;

generating a plurality of brand specific tokens that form part of a brand name;

generating a plurality of product class specific tokens using the plurality of brand specific tokens and the association rule for each of the plurality of token pairs;

generating a plurality of model specific tokens that form part of a product model; and generating a plurality of product lines from the plurality of tokens.

2. The media of claim 1, wherein generating the plurality of brand specific tokens includes:

receiving a list of potential brands;

breaking the list of potential brands into tokens; and applying one or more heuristics that identify the tokens that are likely brands.

3. The media of claim 2, wherein a unigram is a single alphanumeric sequence between spaces and a bigram is two consecutive alphanumeric sequences that occur together in the plurality of product titles.

4. The media of claim 1, wherein the plurality of product class specific tokens is determined by identifying tokens that have a brand count above a threshold number, wherein the brand count is a number of brand specific tokens to which the tokens are related.

5. The media of claim 4, wherein a first token is related to a second token if the association rule score is above a threshold.

6. The media of claim 1, wherein the plurality of product lines is generated using a token tree, wherein a root of the token tree is a brand.

7. The media of claim 6, wherein a first token is added to the root if the first token occurs as a suffix of the root within the plurality of product titles and a confidence factor between the root and the first token is above a threshold.

8. The media of claim 7, wherein a second token is added to the first token if the confidence factor between the second token and the first token exceeds the threshold.

9. A computerized system for generating a list of product lines from a list of product titles, the system including:

an association rule builder that calculates an associative probability that a first token is associated with a second token, wherein the first token and the second token are generated from the list of product titles, wherein the associative probability is determined based on a confidence factor and a support factor, wherein the support factor is a total number of times a first token and a second token occur together in a single product title divided by a total number of product titles within the list of product titles, and wherein the confidence factor is the total number of times the first token and the second token occur together within the list of product titles divided by a number of times the first token occurs within the list of product titles;

a product class recognizer that identifies product class specific tokens within the list of product titles, wherein the product class specific tokens describe a product category that is recognized across multiple brands; and a product line extractor that identifies product lines within the list of product titles.

10. The computerized system of claim 9, further comprising a brand identifier that evaluates a list brands and the list of product titles to generate a plurality of brands specific tokens.

11. The computerized system of claim 10, wherein the product class recognizer identifies product class specific tokens by identifying a plurality of tokens that are related to more than one brand specific token and that are related to above a threshold number of brand specific tokens.

12. The computerized system of claim 9, wherein the product line extractor builds a token tree starting with brand tokens as a tree root.

13. The computerized system of claim 12, wherein a second level token is added to a root if a confidence factor for the second level token and the root exceeds a threshold confidence factor.

14. One or more computer-readable media having computer-executable instructions embodied thereon for performing a method of extracting product lines from a group of product titles, the method comprising:

tokenizing the group of product titles to create a plurality of tokens, wherein the plurality of tokens includes unigrams and bigrams;

generating an association rule for token pairs generated from the plurality of tokens, wherein the association rule indicates how frequently an individual pairing of tokens occur together within the group of product titles, wherein the association rule includes a confidence factor and a support factor, wherein the support factor is a total number of times a first token and a second token occur together in a single product title divided by a total number of product titles within the group of product titles, and wherein the confidence factor is the total number of times the first token and the second token occur together within the group of product titles divided by a number of times the first token occurs within the group of product titles;

creating a product line token tree that includes a brand token as a root node and suffix tokens as second level nodes;

analyzing token branches on the product line token tree to generate a plurality of product lines, wherein a token branch includes the root node and a suffix token; and storing the plurality of product lines.

15. The media of claim 14, wherein a unigram is a single alphanumeric sequence between spaces and a bigram is two consecutive alphanumeric sequences that occur together in the group of product titles.

16. The media of claim 14, wherein the method further comprises recognizing product class specific tokens within the group of product titles using a product class heuristic that identifies a plurality of tokens that are related to more than one brand specific token and that are related to above a threshold number of brand specific tokens.

17. The media of claim 16, wherein a potential second level token node is added to the product line token tree if a confidence for a potential second level token and the root node exceeds a confidence threshold.

18. The media of claim 17, wherein a pair of tokens on the product line token tree are excluded as a product line if the pair of tokens occurs within the group of product titles less than a product-title threshold.

* * * * *